United States Patent
Doan

(10) Patent No.: US 9,191,291 B2
(45) Date of Patent: *Nov. 17, 2015

(54) DETECTION AND HANDLING OF AGGREGATED ONLINE CONTENT USING DECISION CRITERIA TO COMPARE SIMILAR OR IDENTICAL CONTENT ITEMS

(71) Applicant: salesforce.com, inc., San Francisco, CA (US)

(72) Inventor: Dai Duong Doan, New Brunswick (CA)

(73) Assignee: salesforce.com, inc., San Francisco, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/021,977

(22) Filed: Sep. 9, 2013

(65) Prior Publication Data

US 2014/0082755 A1    Mar. 20, 2014

Related U.S. Application Data

(60) Provisional application No. 61/701,504, filed on Sep. 14, 2012.

(51) Int. Cl.
| | |
|---|---|
| G06F 7/04 | (2006.01) |
| H04L 29/06 | (2006.01) |
| H04L 9/32 | (2006.01) |
| H04L 9/00 | (2006.01) |
| H04L 12/26 | (2006.01) |
| G06F 21/60 | (2013.01) |
| H04L 29/08 | (2006.01) |
| G06F 21/10 | (2013.01) |
| G11B 20/00 | (2006.01) |
| G06F 21/64 | (2013.01) |
| H04L 9/08 | (2006.01) |

(52) U.S. Cl.
CPC ............... *H04L 43/08* (2013.01); *G06F 21/60* (2013.01); *H04L 67/2842* (2013.01); *G06F 21/10* (2013.01); *G06F 21/64* (2013.01); *G11B 20/0021* (2013.01); *H04L 9/08* (2013.01); *H04L 9/3281* (2013.01); *H04L 69/28* (2013.01)

(58) Field of Classification Search
CPC ..... G06F 21/10; G06F 21/64; G11B 20/0021; H04L 9/08; H04L 9/3281
USPC ........ 726/32; 713/165, 168, 176, 180; 380/44
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

*Primary Examiner* — Aravind Moorthy

(74) *Attorney, Agent, or Firm* — Ingrassia Fisher & Lorenz, P.C.

(57) ABSTRACT

A computer-implemented method is presented herein. The method obtains a first content item from an online source, and then generates a characterizing signature of the first content item. The method continues by finding a previously-saved instance of the characterizing signature and retrieving data associated with a second content item (the second content item is characterized by the characterizing signature). The method continues by analyzing the data associated with the second content item, corresponding data associated with the first content item, and decision criteria. Thereafter, either the first content item or the second content item is identified as an original content item, based on the analyzing. The other content item can be flagged as an aggregated content item.

20 Claims, 5 Drawing Sheets

(56) References Cited

U.S. PATENT DOCUMENTS

| | | | |
|---|---|---|---|
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,615,348 B1 * | 9/2003 | Gibbs | 713/162 |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,401,094 B1 | 7/2008 | Kesler | |
| 7,412,455 B2 | 8/2008 | Dillon | |
| 7,620,655 B2 | 11/2009 | Larsson et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0058803 A1 * | 3/2007 | Suga | 380/30 |
| 2008/0249972 A1 | 10/2008 | Dillon | |
| 2009/0048904 A1 | 2/2009 | Newton et al. | |
| 2009/0063414 A1 | 3/2009 | White et al. | |

\* cited by examiner

DETECTION AND HANDLING OF AGGREGATED ONLINE CONTENT USING DECISION CRITERIA TO COMPARE SIMILAR OR IDENTICAL CONTENT ITEMS

CROSS-REFERENCE TO RELATED APPLICATION

This application claims the benefit of U.S. provisional patent application No. 61/701,504, filed Sep. 14, 2012.

TECHNICAL FIELD

Embodiments of the subject matter described herein relate generally to a computer implemented methodology for determining whether the source of online content is a content aggregator. More particularly, embodiments of the subject matter relate to a webcrawling system that detects content aggregator sources.

BACKGROUND

The Internet is a source of much useful information. However, the content of the internet is also polluted with spam data and duplicated content. Many useful websites represent the legitimate source of content such as news items, articles, comments, user posts, and the like. Social network and blog sites are also a rich source of online content. A blog is a discussion or collection of information published on the Internet, typically formatted as a series of discrete entries, called posts, usually displayed in reverse chronological order so that the most recent post appears first. Webcrawlers can obtain updated information from a blog through its Rich Site Summary (RSS) feed. An RSS feed normally includes summarized text, the publication date of a post and the name of the author. Thus, webcrawlers can analyze RSS data to characterize, index, and otherwise process blog site content (and other website content).

Marketing campaigns use information mined from the web (using, for example, a webcrawling system) to assist in meeting the needs of their customers. However, more than one-third of the content on the web is duplicated or copied content. Duplicate or near-duplicate posts are known as aggregated content, and such duplicate or near-duplicate content is often found on aggregator websites (or, simply, aggregators). Most aggregated content is generated automatically by stealing original content from legitimate sources (original sources or legitimate "republication" sources). In order to provide high quality content to end users, it is important to identify and eliminate aggregators and/or aggregated content when crawling the web.

Accordingly, it is desirable to have a computer implemented methodology for detecting the presence of aggregated online content. In addition, it is desirable to provide and maintain a system that is capable of dynamically responding to aggregated content in an efficient and effective manner. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter presented here generally relates to webcrawling technology that analyzes websites, webpages, website content, blogs, and the like. The following description may refer to online content, which may be found on or in association with webpages, websites, blogs, posts, blogposts, comments, forums, or the like. These and other forms on online content (which may be targeted by content aggregators) are contemplated by this description.

A webcrawling system as described herein analyzes web content to determine whether or not the content is aggregated content. Given a very large set of posts, one challenge for an effective solution is how best to find any two posts having similar content. Moreover, given a set of posts having similar content, the system must differentiate between aggregated content and original or otherwise legitimate content.

In certain embodiments, the system analyzes the RSS information of blog posts and flags or otherwise identifies aggregated content in an appropriate manner. The reviewed RSS information may include, without limitation: summarized text, the publication date of a post, and the name of the author. If for some reason the publication date of a post is missing, the system sets the publication date of the post to the date the post was crawled.

The embodiments described herein may use a fast and efficient method for detecting whether any two posts contain similar or identical content. The systems and methods generate a content key for each individual post by combining a predefined number of short phrases, words, text, or letters from the post content. Using short phrases allows the systems and methods to be able to catch tricky aggregators such as those that copy only a few paragraphs or those that change common words in the original content. The systems and methods then hash the content key using, for example, the SHA-1 algorithm, and store the hashed key in a cache for a fast lookup. The system assumes that two posts have similar content if their hashed keys are the same. A memory sharing model is used in certain implementations to improve the performance of the lookup service.

The embodiments described herein may use a heuristic method to differentiate between original content and aggregated content. The systems and methods presented here use information associated with the post itself (such as the author, crawled date, and/or outbound links), and information from its RSS feed (such as volume and frequency of feed updates) to identify aggregated content. In practice, other detectable factors may also be considered. Note that the first-crawled post need not be the original content; there are situations where aggregated content is crawled long before the corresponding original content. Moreover, the published date of a post is not always extracted correctly for various reasons.

Figure 1:
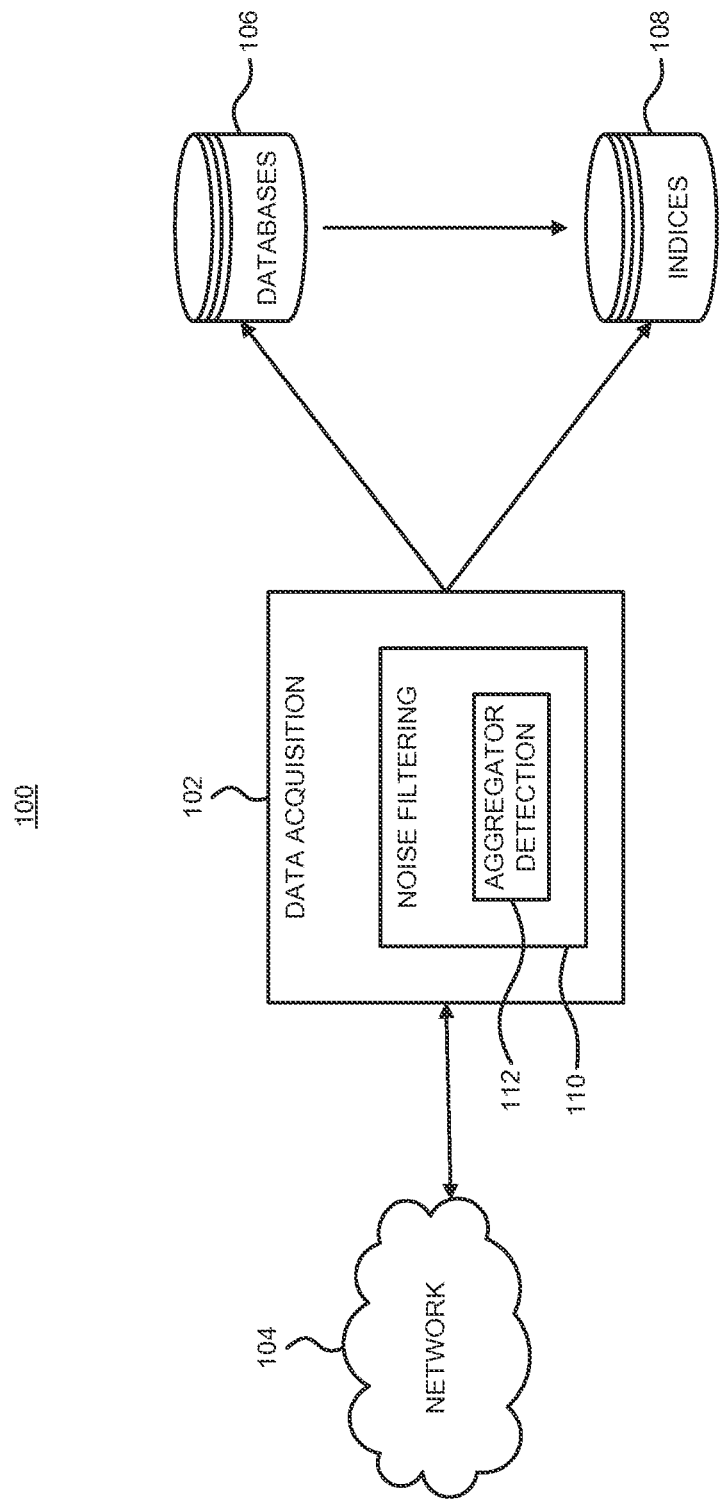
FIG. 1 is a simplified schematic representation of a portion of a webcrawler system that incorporates an aggregator detection feature.

Turning now to the drawings, FIG. 1 is a simplified schematic representation of a portion of a webcrawler system 100 that incorporates a content aggregator detection feature. The system is computer-based and computer-implemented in that it may include any number of computing systems, devices, or components. FIG. 1 depicts a data acquisition module 102 of the system 100, which is suitably configured to obtain data and information from any number of online sources via a network 104. It should be appreciated that the network 104 may utilize any number of network protocols and technologies (e.g., a local area network, a wireless network, the Internet, a cellular telecommunication network, or the like). Although not always required, the network 104 provides Internet access to the data acquisition module 102 such that the system 100 can perform webcrawling to obtain content data, metadata, and other types of information regarding different websites, blogs, webpages, and other online sources as needed.

The system 100 includes or cooperates with one or more databases 106 and one or more indices 108 that are utilized to store and index information obtained and processed by the data acquisition module 102. Although not shown in FIG. 1, the databases 106 and indices 108 may communicate with other processing modules, software, application program interfaces, user interfaces, and the like for purposes of organizing, formatting, and presenting information to a user. Such elements, components, and functionality are commonly utilized with conventional webcrawling systems and applications and, therefore, they will not be described in detail here.

The data acquisition module 102 may be implemented as a suitably configured module of a computing system. In this regard, the data acquisition module 102 can be realized as a software-based processing module or logical function of a host computer system. The data acquisition module 102 performs a number of conventional data acquisition and processing functions that need not be described in detail here. In addition to such conventional functionality, the data acquisition module 102 also performs certain noise filtering techniques, which are schematically depicted as a noise filtering module 110 in FIG. 1. In accordance with some embodiments, the noise filtering module 110 is configured to detect and manage aggregated content. This functionality is schematically depicted in FIG. 1 as an aggregator detection module 112. The aggregator detection module 112 determines whether crawled content is aggregated content and, in response to the determination, flags, marks, or otherwise identifies the content (e.g., a blog post, a website article, user posts, or other online content items) as aggregated content. The crawled data related to the aggregated content can be saved and processed as usual, but the flagging of aggregated content allows the user to filter aggregated content if so desired while viewing, organizing, or analyzing webcrawler data.

Figure 2:
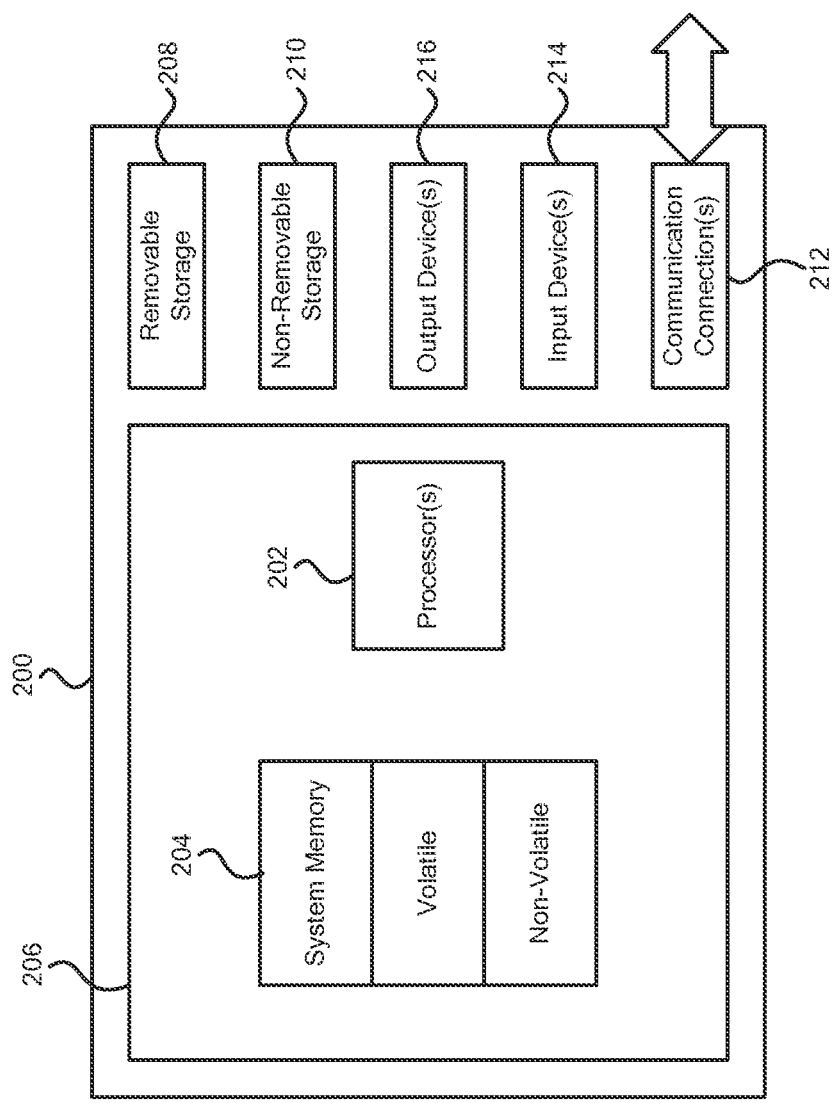
FIG. 2 is a simplified schematic representation of an exemplary computing system suitable for implementing aggregator detection.

FIG. 2 is a simplified schematic representation of an exemplary computing system 200 that is suitable for implementing the aggregated content detection techniques described herein. In this regard, the aggregator detection module 112 may be implemented as software-based processing logic that is written and configured to support the various aggregator detection techniques and methodologies described in more detail below. In certain embodiments, therefore, the aggregator detection module 112 is realized using a computer readable medium having appropriately written computer-executable instructions stored thereon. When the computer-executable instructions are executed by a processor of the computing system 200, the detection methods described herein are performed. Thus, the computing system 200 described here could be used to implement the data acquisition module 102 shown in FIG. 1. Moreover, a client device or a user device could be configured in accordance with the general architecture shown in FIG. 2.

The computing system 200 is only one example of a suitable operating environment and is not intended to suggest any limitation as to the scope of use or functionality of the inventive subject matter presented here. Other well-known computing systems, environments, and/or configurations that may be suitable for use with the embodiments described here include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The computing system 200 and certain aspects of the exemplary aggregator detection module 112 may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

The computing system 200 typically includes at least some form of computer readable media. Computer readable media can be any available media that can be accessed by the computing system 200 and/or by applications executed by the computing system 200. By way of example, and not limitation, computer readable media may comprise tangible and non-transitory computer storage media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing system 200. Combinations of any of the above should also be included within the scope of computer readable media.

Referring again to FIG. 2, in its most basic configuration, the computing system 200 typically includes at least one processor 202 and a suitable amount of memory 204. Depending on the exact configuration and type of platform used for the computing system 200, the memory 204 may be volatile (such as RAM), non-volatile (such as ROM, flash memory, etc.) or some combination of the two. This most basic configuration is identified in FIG. 2 by reference number 206. Additionally, the computing system 200 may also have additional features/functionality. For example, the computing system 200 may also include additional storage (removable and/or non-removable) including, but not limited to, magnetic or optical disks or tape. Such additional storage is represented in FIG. 2 by the removable storage 208 and the non-removable storage 210. The memory 204, removable storage 208, and non-removable storage 210 are all examples of computer storage media as defined above.

The computing system 200 may also contain communications connection(s) 212 that allow the computing system 200 to communicate with other devices. For example, the communications connection(s) could be used to establish data communication between the computing system 200 and devices or terminals operated by developers or end users, and to establish data communication between the computing system 200 and the Internet. The communications connection(s) 212 may also be associated with the handling of communication media as defined above.

The computing system 200 may also include or communicate with various input device(s) 214 such as a keyboard, mouse or other pointing device, pen, voice input device, touch input device, etc. Although the exemplary embodiment described herein utilizes a mouse device, certain embodiments can be equivalently configured to support a trackball device, a joystick device, a touchpad device, or any type of pointing device. The computing system 200 may also include or communicate with various output device(s) 216 such as a display, speakers, printer, or the like. All of these devices are well known and need not be discussed at length here.

Figure 3:
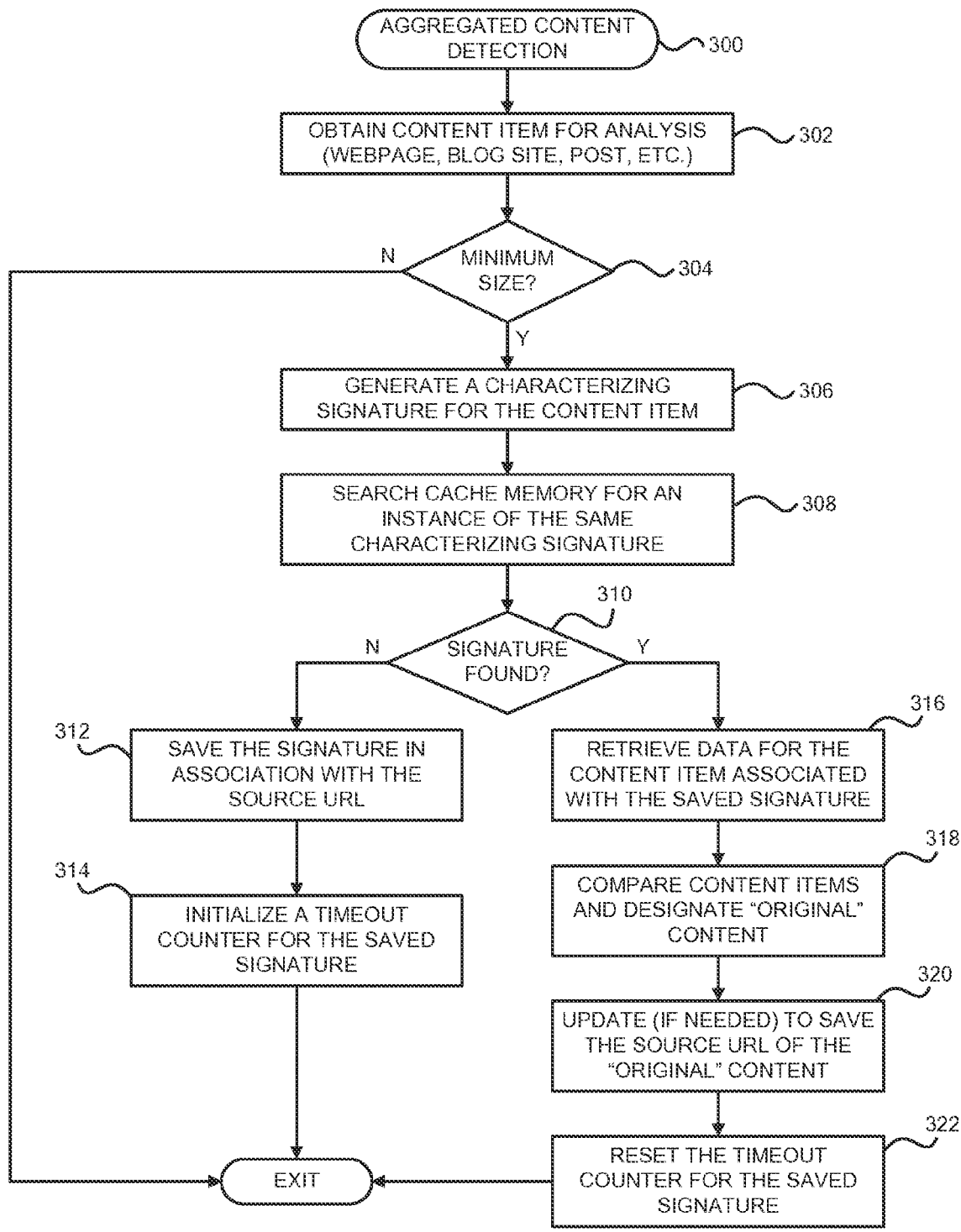
FIG. 3 is a flow chart that illustrates an exemplary embodiment of an aggregator detection process.

As mentioned above, an exemplary embodiment of the system 100 includes or cooperates with at least one processor and a suitable amount of memory that stores executable instructions that, when executed by the processor, support various data acquisition and aggregator detection functions. In this regard, FIG. 3 is a flow chart that illustrates an exemplary embodiment of an aggregator detection process 300, which may be performed by the system 100. The various tasks performed in connection with a process described herein may be performed by software, hardware, firmware, or any combination thereof. In practice, portions of a described process may be performed by different elements of the described system. It should be appreciated that an illustrated process may include any number of additional or alternative tasks, the tasks shown in a figure need not be performed in the illustrated order, and a described process may be incorporated into a more comprehensive procedure or process having additional functionality not described in detail herein. Moreover, one or more of the tasks shown in a figure could be omitted from an embodiment of the described process as long as the intended overall functionality remains intact.

The process 300 obtains an online content item from any suitable online or web-based source (task 302) using any appropriate technique or technology. In this regard, the process 300 may utilize conventional webcrawling methodologies to acquire the content item. As used here, an online content item may be any of the following, without limitation: a blog site; a blog post; a website; a webpage; a video; a news item; a social media profile page; a user post (e.g., a post on a social media site such as FACEBOOK); a user comment; a user message (e.g., a short message such as the type generated by the TWITTER service); etc. It should be appreciated that the foregoing list is merely exemplary, and that the list is not intended to be exhaustive, restrictive, or limiting in any way. Moreover, a content item may include or be associated with corresponding RSS data, HTML code, and/or other characterizing information or data.

For purposes of this example, it is assumed that the content item is a post that includes a plurality of words (e.g., a blog post, a posted article, a user comment, or other text-based post). In certain embodiments, the process 300 is designed to disregard relatively short content items and, conversely, to only consider content items having at least a minimum number of words. Accordingly, the process 300 checks whether the content item under analysis is at least a minimum size (query task 304). For this example, the size represents the word count of the content item, and the threshold word count is within the range of about 100 to 500 words. In alternative implementations, the size could represent the sentence count, the paragraph count, the file size, or any suitable metric. If the content item does not satisfy the minimum size requirement (the "No" branch of query task 304), then the process 300 skips the aggregated content detection routine and exits without flagging or marking the content item.

If the content item under analysis satisfies the minimum size threshold (the "Yes" branch of query task 304), then the process 300 continues by generating a characterizing signature for the content item (task 306). As explained in more detail below with reference to FIG. 4, task 306 derives the characterizing signature from some of the words contained in the content item. The characterizing signature is a key, metadata, a code, or any appropriate identifier that can be used to identify the actual written subject matter of the content item in a compact and shorthand manner. Thus, two identical copies of the same article or post will have the same characterizing signature. As explained in more detail below, two substantially identical copies of the same article or post (where some insignificant or common words are different) may also have the same characterizing signature.

After obtaining the characterizing signature of the content item of interest, the process 300 searches for a previously-saved instance of the same characterizing signature (task 308). In practice, task 308 may search a cache memory architecture of the host system and/or any appropriate memory element to find the characterizing signature. If the characterizing signature is not found (the "No" branch of query task 310), then the process 300 assumes that the content item has not been previously analyzed or reviewed. Accordingly, the newly-generated characterizing signature is saved for future reference (task 312). The characterizing signature is preferably saved in association with the uniform resource locator (URL) of the content item and/or the data that defines and specifies the content item itself, such that the system can review and analyze the source of the content item as needed. Additional information or data related to the content item may also be saved in a manner that is linked to or otherwise associated with the saved characterizing signature (e.g., some or all of the written content itself, metadata, HTML code, HTML tags, RSS information, or the like). For the sake of processing speed and efficiency, the characterizing signature and other data associated with the content item is saved in the cache memory architecture of the host system.

The process 300 may also initialize a timeout counter and/or set a time stamp for the recently-saved characterizing signature (task 314). This timer feature can be used to designate a limited active time period for each saved signature. A limited lifespan is desirable because research has found that aggregators tend to copy and republish relatively new content, and that old content rarely appears on aggregator websites. Moreover, old content is usually removed from aggregator websites after a period of time. Thus, the use of a timeout ensures that the system does not search for old characterizing signatures that are not likely to represent aggregated content, and increases the efficiency of the cache memory architecture. After setting the timeout counter or time stamp for the saved signature, the process 300 exits.

If a previously-saved instantiation of the newly generated characterizing signature is found (the "Yes" branch of query task 310), then the process 300 assumes that the content item under analysis (or a virtually identical copy thereof) has been received and characterized before. This conclusion is reached because each version of the same characterizing signature will have a different URL associated or saved therewith. Thus, when the newly generated characterizing signature matches a previously saved signature, the process 300 presumes that at least one of the content items is aggregated content. Accordingly, the process 300 retrieves certain information or data for the content item that is associated with or linked to the previously-saved instance of the signature (task 316). For ease of description, the previously-considered content item will be referred to herein as the "saved" content item. Again, the saved content item is also characterized by the signature generated at task 306.

At this point, the process 300 attempts to determine which of the two content items (the newly obtained content item or the saved content item) is aggregated content. To this end, the process 300 assumes that one of the two content items is aggregated content (although in reality this assumption may not always be accurate). Consequently, after the process 300 flags one of the two content items as an aggregated content item, it flags the other content item as "original" content. Note that one content item will be flagged as "original" content relative to the flagged aggregated content item, whether or not the flagged "original" content was actually obtained from the true original source. In practice, the host system may be suitably configured such that the same content item (sourced from the same URL) is not redundantly processed. Alternatively, the process 300 may have certain safeguarding measures to handle the scenario where the content item under analysis is identical to the saved content item.

Figure 5:
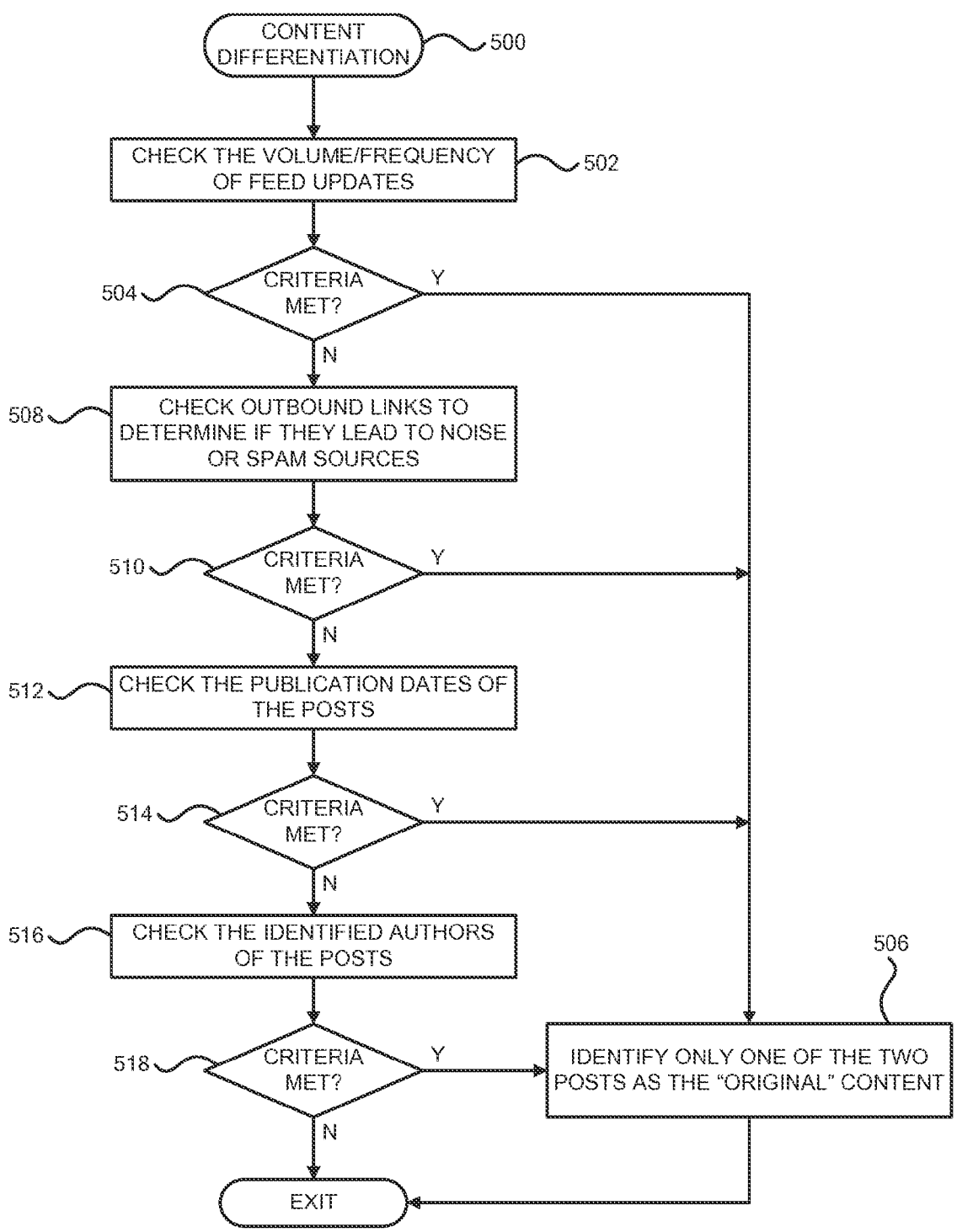
FIG. 5 is a flow chart that illustrates an exemplary embodiment of a content differentiation process, which may be performed in connection with the aggregator detection process shown in FIG. 3.

As explained in more detail below with reference to FIG. 5, the process 300 analyzes or compares the two content items, data associated with the source URLs of the content items, metadata, and/or any appropriate data associated with the content items. The analysis and comparison is suitably designed to identify/designate one of the two content items as an original content item (task 318). Accordingly, the process 300 may utilize predetermined decision criteria that governs the manner in which task 318 is performed. The process 300 may also flag or designate the other content item as an aggregated content item. The flagging of aggregated content is useful for purposes of filtering the aggregated content from stored webcrawler data, which in turn enables the system to output the filtered webcrawler data for presentation to a user (e.g., present webcrawler data with aggregated content filtered out, or filter the webcrawler data such that only the aggregated content is presented).

The process 300 may update a database (e.g., the cache memory architecture of the host system) in response to the determination made at task 318. More specifically, if the process 300 determines that the new content item under analysis is the "original" content, then the memory is updated to save information related to the new content item, in association with the saved characterizing signature (task 320). In other words, the previously-saved information (corresponding to the saved content item) is replaced with new information that corresponds to the new content item. For this particular embodiment, task 320 saves the source URL of the new content item in association with the characterizing signature. In addition, the process 300 may delete the source URL of the other content item, such that the characterizing signature is no longer saved in association with the other content item. Of course, other information and data related to the new content item may also be saved at this time, including any or all of the information described above with reference to task 312. If task 320 is performed to save a new source URL for a new content item, then the timeout counter for the saved characterizing signature is reset, preferably to its initial value or state (task 322). The timeout counter is reset for the reasons explained above with reference to task 314.

In contrast, if task 318 determines that the new content item is an aggregated content item (relative to the saved content item), then task 320 need not update any records or data saved in association with the previously-saved signature. In other words, the saved content item is simply maintained as the baseline "original" content item for purposes of ongoing comparisons to other content items that have a matching signature. Moreover, the timeout counter for the previously-saved signature will not be reset. This allows the process 300 to be repeated in an ongoing manner to update the designated original content item as needed, or until the timeout counter expires.

Figure 4:
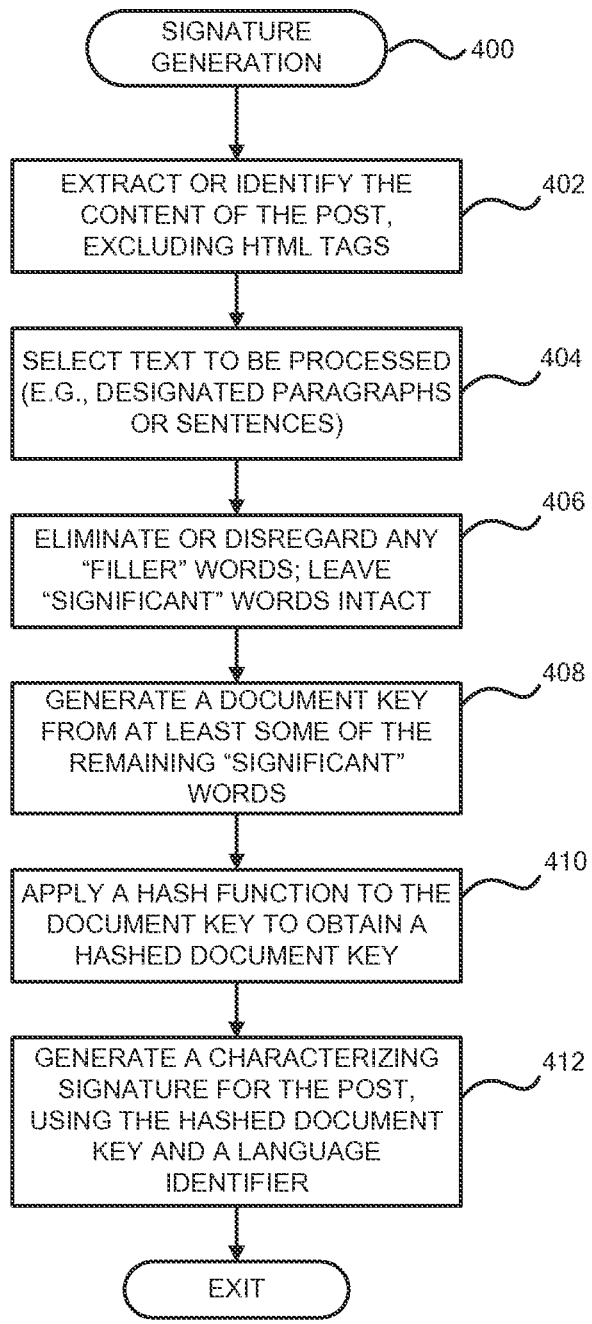
FIG. 4 is a flow chart that illustrates an exemplary embodiment of a signature generation process, which may be performed in connection with the aggregator detection process shown in FIG. 3.

As explained above, the process 300 generates and compares characterizing signatures of online content items to detect the presence of aggregated content. Although the particular type, format, and configuration of the characterizing signatures may vary from one implementation to another, certain preferred embodiments employ the signature generation scheme depicted in FIG. 4. In this regard, FIG. 4 is a flow chart that illustrates an exemplary embodiment of a signature generation process 400, which may be performed in connection with the aggregator detection process shown in FIG. 3.

The signature generation process 400 may begin by extracting or identifying the relevant online content of interest (task 402), which may be taken from a webpage, a blog post, a forum entry, a user comment, a published article, or the like. For this particular example, the extracted content represents the written text-based content of a post, excluding HTML tags, and excluding any "hidden" codes, metadata, or the like. Identifying the text content of interest enables the process 400 to select only a portion of the words that appear in the text content. More specifically, the selection routine may begin by selecting the text to be processed, in accordance with a defined word selection algorithm (task 404).

Although the particular word selection algorithm may vary from one embodiment to another, this example chooses an initial number of paragraphs (or sentences) from the content item. The routine selects the paragraphs that appear at the beginning of the content because research has shown that most aggregators tend to copy the beginning portion of original content. Thus, the accuracy of the process 400 is not compromised by selecting only some of the initial paragraphs from the beginning of a post. Although the exact number of paragraphs chosen at task 404 may vary to suit the needs of the given system, this example assumes that the first four paragraphs are chosen. This example also assumes that each paragraph contains at least a minimum number of sentences and/or at least a minimum number of words as needed to carry out the remainder of the process 400. If for some reason any of these baseline requirements are not met, then task 404 may follow an alternative scheme as a backup measure.

Next, the process 400 eliminates or disregards any filler words that appear in the content (task 406). More specifically, the process 400 disregards filler words that appear in the subset of sentences/paragraphs chosen at task 404. As used here, filler words are any designated words that are defined by the system such that the process 400 selectively disregards them. Although not always required, most common, ordinary, and short words can be defined as filler words. For example, common filler words may include any of the following, without limitation: the; a; for; we; and; that; is; are; of; be; to; some; from; in; on; do; all; at. After eliminating or disregarding the filler words, a set of "significant" words will remain intact for consideration. In accordance with this example, a "significant" word must satisfy the following rules: (1) the word must appear in the chosen text; and (2) the word is not eliminated as a filler word. Thus, the act of filtering out the filler words inherently results in a set of significant words, at least for this particular example.

The process 400 continues by generating and obtaining a document key from at least some of the remaining significant words (task 408). In certain embodiments, the word selection algorithm selects only a portion of the significant words to generate the document key. For this particular example, task 408 chooses, from each of the sentences/paragraphs under consideration, a leading number of the significant words (alternatively, the number of significant words taken from the paragraphs may vary from one paragraph to another). Although the exact number of significant words chosen at task 408 may vary to suit the needs of the given system, this example assumes that the five leading significant words are chosen. Of course, this example assumes that each sentence/paragraph contains at least a minimum number of significant words as needed to carry out the remainder of the process 400. If for some reason a chosen paragraph has less than five significant words, then task 408 may follow an alternative scheme as a backup measure.

The document key represents an ordered sequence of the selected significant words. The document key need not be intelligible, and it need not convey any meaningful context. As mentioned above, this example considers the leading four paragraphs of the content, removes all filler words, and then selects the leading five significant words from each paragraph. This scheme results in twenty significant words, which may be arranged in any desired order. In accordance with the simple embodiment presented here, the significant words are arranged in order of appearance. Consider the four paragraphs in following example:

We propose the following fast and efficient method for detecting any two posts containing similar content. We generate a content key for each individual post by combining a predefined number of short phrases from its content.

Using short phrases allows us to be able to catch tricky aggregators such as those taking only a few paragraphs or changing common words in the original content.

This is a test message for a demonstration. We generate a content key for each individual post by combining a predefined number of short phrases from its content.

We developed a heuristic method to differentiate between the original and the copied posts. Note that the first crawled post is not always the original. There are situations in which the aggregators are crawled long before the original post.

The five leading significant words in each paragraph are italicized in the above excerpt. The non-italicized words represent filler words or significant words that are not selected for purposes of generating the document key. The document key for this example will be as follows: propose following fast efficient method using short phrases allows catch test message demonstration generate content developed heuristic method differentiate between. Note that this document key contains twenty significant words, arranged in the same order in which they appear in the four paragraphs shown above.

Next, the process 400 applies a hash function, a translation algorithm, an encoding algorithm, or any suitable transformation formula to the document key (task 410), which results in a hashed document key. Although any appropriate algorithm or formula may be utilized at task 410, in certain non-limiting embodiments, task 410 applies the well-known SHA-1 hash function to the document key (which results in a 160-bit hash value). Notably, given the same significant words selected from two content items, task 508 will generate the same hashed document key (hash value).

In certain embodiments, the characterizing signature for the content item is created from the hashed document key and a language identifier (task 412). In this regard, the language identifier is a code, a number, or any information that indicates the language used to author the content item of interest. For example, the language identifier may be a two-character code that specifies the language in which the content item is written. Task 412 may generate or derive the characterizing signature as a function of the hashed document key and the language identifier. In some embodiments, the language identifier is appended to the hashed document key, e.g., at the beginning or end of the hashed document key. Moreover, the signature may include an appropriate separator character (such as a colon) between the language identifier and the hashed document key.

As explained above, the process 300 can be used to compare two content items that share the same characterizing signature, for purposes of designating one as original content and the other as aggregated content (relative to each other). Although the specific comparison and analysis methodology may vary from one embodiment to another, certain preferred embodiments employ the content differentiation scheme depicted in FIG. 5. In this regard, FIG. 5 is a flow chart that illustrates an exemplary embodiment of a content differentiation process 500, which may be performed in connection with the aggregator detection process shown in FIG. 3.

Although not always required in all embodiments, the content differentiation process 500 is designed to perform a series of checks in a prioritized manner. In this regard, if the decision criteria for a higher level check is satisfied, then the process 500 makes its determination based on that check (and it need not continue with any of the other checks). In accordance with some embodiments, the process 500 may compare information related to the two content items against each other, or individually against the predetermined decision criteria. In alternative embodiments, the process 500 may analyze the two content items and the decision criteria in a comprehensive manner to form the basis of the "original" versus "aggregated" content decision.

The illustrated embodiment of the process 500 begins by checking the volume and/or update frequency associated with the feeds or sources of the content items (task 502). In practice, the process 500 may calculate or obtain the update frequency of the source website or webpage of each content item, and compare the update frequency to a threshold value that is chosen as a way to identify whether or not an online source may be a content aggregator. In this regard, a typical content aggregator site will be updated at a relatively high frequency (measured in number of posts or content items per unit of time), while a legitimate originator of content will be updated at a relatively low frequency. Thus, the process 500 may use a frequency threshold as the predetermined update frequency criteria for purposes of distinguishing original content from aggregated content.

If the predetermined update frequency criteria is satisfied for only one of the two content items (the "Yes" branch of query task 504), then the process identifies only one content item as the "original" content item (task 506). Task 506 may also identify the other content item as the "aggregated" content item. If the update frequency of both content items is less than the predetermined threshold frequency, then the "No" branch of query task 504 is followed. If the update frequency of both content items is greater than the predetermined threshold frequency, then the process 500 may follow the "No" branch of query task 504, under the assumption that the update frequency cannot be utilized to make a decision (alternatively, the process 500 may designate the content item associated with the higher update frequency as the "aggregated" content item, and designate the content item associated with the lower update frequency as the "original" content item).

If the update frequency criteria is not satisfied for either content item (the "No" branch of query task 504), then the process 500 continues by checking the outbound links associated with the two content items (task 508). Accordingly, when the content items are not determined to be aggregated content, based on the update frequency criteria, the process 500 performs another check, which is of lower ranking or priority. This example assumes that the webpages or websites that represent the sources of the two content items include outbound links to other webpages, websites, or online content. Thus, task 508 may investigate those outbound links to determine whether or not they lead to noise content, spam sources, buy/sell sites, advertisement sites, pornography, revenue-generating sites, or the like. In practice, the process 500 could simply count the number of suspicious or illegitimate outbound links (corresponding to each content item) and compare the count against a predetermined threshold count value that is chosen as a way to identify whether or not an online source may be a content aggregator. In this regard, the process 500 assumes that a source page having a high number of suspicious or revenue-generating outbound links is likely to be an aggregator site. Thus, the process 500 may use a count threshold as the predetermined outbound link criteria for purposes of distinguishing original content from aggregated content.

If the outbound link criteria is satisfied for only one of the two content items (the "Yes" branch of query task 510), then the process identifies one of the two content items as the "original" content item (task 506), and the other content item as the "aggregated" content item. If the number of outbound links associated with both content items is less than the count threshold, then the "No" branch of query task 510 is followed. If the outbound link count for both content items is greater than the threshold count value, then the process 500 may follow the "No" branch of query task 510, under the assumption that the outbound link criteria cannot be utilized to make a decision (alternatively, the process 500 may designate the content item associated with the higher count as the "aggregated" content item, and designate the content item associated with the lower count as the "original" content item).

If the outbound link criteria is not satisfied for either content item (the "No" branch of query task 510), then the process 500 continues by checking the stated publication dates of the content items (task 512). In practice, the process 500 may calculate the age of each content item from the respective publication date and the current date. The ages of the content items could be compared to each other, or they could be compared to a threshold age or time value that is chosen as a way to identify whether or not a given content item may be provided by a content aggregator. In this regard, a typical content aggregator site will focus on relatively recent content, while legitimate original content may have relatively old publication dates. Thus, the process 500 may use a threshold corresponding to a time period, an age, or a number of days as the predetermined publication date criteria for purposes of distinguishing original content from aggregated content. As another example, the process 500 may calculate the difference between the two publication dates and compare the difference to a threshold difference value. In accordance with this methodology, if a subsequently published content item was published more than a threshold number of days or months after the previously published content item, then the subsequently published content item can be flagged as the aggregated content item.

If the predetermined publication date criteria is satisfied for only one of the two content items (the "Yes" branch of query task 514), then the process identifies one of the content items as the "original" content item (task 506), and the other content item as the "aggregated" content item. If both content items were published before the threshold date, or if both content items are older than the threshold period of time, then the "No" branch of query task 514 is followed. If, however, both content items are relatively new or fresh, then the process 500 may follow the "No" branch of query task 514, under the assumption that the publication dates cannot be utilized to make a decision (alternatively, the process 500 may designate the newer content item as the "aggregated" content item, and designate the older content item as the "original" content item).

If the publication date criteria is not satisfied for either content item (the "No" branch of query task 514), then the process 500 continues by checking the identified authors (if any) of the two content items (task 516). Accordingly, when the content items are not determined to be aggregated content, based on the publication date criteria, the process 500 performs another check, which is of lower ranking or priority. This example assumes that both of the content items include authorship credit, an author field, or the like. Thus, task 516 may review the names or identities of the authors to determine whether or not the named authors are suggestive of aggregated content. In practice, the host system could maintain a list of names or words that, when used to identify an author, are indicative of aggregated content. For example, aggregated content may be indicated if the author of a content item is: Admin; Administrator; Anonymous; or System. It should be appreciated that this list is merely exemplary in nature, and is not intended to limit or restrict the scope of the described subject matter in any way. Thus, the process 500 may use certain predefined words or phrases as predetermined authorship criteria for purposes of distinguishing original content from aggregated content.

If the authorship criteria is satisfied for only one of the two content items (the "Yes" branch of query task 518), then the process identifies one of the two content items as the "original" content item (task 506), and the other content item as the "aggregated" content item. If the process 500 determines that both content items appear to have legitimate authors, then the "No" branch of query task 518 is followed and the process 500 exits (for this scenario, the process 500 may simply preserve the status quo and maintain the "original" designation of the content item associated with the previously-saved signature). If the process 500 determines that the stated authorship of both content items is suspicious, then the process 500 may follow the "No" branch of query task 518, under the assumption that the authorship criteria cannot be utilized to make a decision.

It should be appreciated that additional decision criteria could be used if so desired. Moreover, the process 500 need not be performed in a hierarchical or priority-based manner. In other words, an alternative embodiment of process 500 may consider all of the various checks and decision criteria described above before distinguishing the original content from the aggregated content, wherein the decision is influenced by the different criteria. Furthermore, it should be appreciated that alternative thresholding schemes and/or criteria could be used for the decisions made during the process 500. For example, different threshold values could be used to accommodate different operating conditions, days of the week, categories of genres of content under investigation, or the like. As another example, more complicated decision algorithms could be implemented rather than straightforward examples mentioned above. These and other options are contemplated by this description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method comprising:
   obtaining, at a computer system, a first content item from an online source, wherein the first content item is obtained via network connection;
   generating a characterizing signature of the first content item, by:
      selecting a quantity of text for analysis, the first content item comprising the quantity of text;
      eliminating filler words from the quantity of text to identify a plurality of significant words;
      arranging a predetermined number of the plurality of significant words from the quantity of text to create a document key;
      applying a hash function to the document key to obtain a hashed document key; and
      appending a language identifier to the hashed document key to create the characterizing signature;
   finding a previously-saved instance of the characterizing signature in a cache memory architecture of the computer system;
   retrieving, from the cache memory architecture, data associated with a second content item, in response to finding the previously-saved instance of the characterizing signature, wherein the second content item is characterized by the characterizing signature;
   analyzing the data associated with the second content item, corresponding data associated with the first content item, and decision criteria; and
   identifying either the first content item or the second content item as an original content item, based on the analyzing.

2. The computer-implemented method of claim 1, wherein:
   the identifying identifies the second content item as the original content item; and
   the method further comprises flagging the first content item as an aggregated content item.

3. The computer-implemented method of claim 1, wherein:
   the identifying identifies the first content item as the original content item; and
   the method further comprises flagging the second content item as an aggregated content item.

4. The computer-implemented method of claim 3, further comprising:
   saving a source uniform resource locator (URL) of the first content item in association with the characterizing signature.

5. The computer-implemented method of claim 4, further comprising:
   deleting a source URL of the second content item such that the characterizing signature is no longer saved in association with the second content item.

6. The computer-implemented method of claim 1, wherein the analyzing comprises:
   comparing a first update frequency associated with a source of the first content item against predetermined update frequency criteria; and
   comparing a second update frequency associated with a source of the second content item against the predetermined update frequency criteria.

7. The computer-implemented method of claim 1, wherein the analyzing comprises:
   analyzing one or more first outbound links associated with a source of the first content item in view of predetermined outbound link criteria; and
   analyzing one or more second outbound links associated with a source of the second content item in view of the predetermined outbound link criteria.

8. The computer-implemented method of claim 1, wherein the analyzing comprises:
   checking a first publication date of the first content item relative to predetermined publication date criteria; and
   checking a second publication date of the second content item relative to the predetermined publication date criteria.

9. The computer-implemented method of claim 1, wherein the analyzing comprises:
   reviewing a first identified author of the first content item in view of predetermined authorship criteria; and
   reviewing a second identified author of the second content item in view of the predetermined authorship criteria.

10. A computer-implemented method comprising:
    generating, at a computer system, a first characterizing signature of a first content item, by:
       selecting a quantity of text for analysis, the first content item comprising the quantity of text;
       eliminating filler words from the quantity of text to identify a plurality of significant words;

arranging a predetermined number of the plurality of significant words from the quantity of text to create a document key;
applying a hash function to the document key to obtain a hashed document key; and
appending a language identifier to the hashed document key to create the first characterizing signature;
determining, at the computer system, that the first characterizing signature of a first content item matches a second characterizing signature of a second content item, wherein the second characterizing signature has been previously saved in a memory element of the computer system;
comparing an update frequency associated with a source of the first content item against predetermined update frequency criteria to determine whether the first content item is aggregated content;
when the first content item is not determined to be aggregated content based on the predetermined update frequency criteria, analyzing one or more outbound links associated with a source of the first content item in view of predetermined outbound link criteria, to determine whether the first content item is aggregated content;
when the first content item is not determined to be aggregated content based on the predetermined outbound link criteria, checking a publication date of the first content item relative to predetermined publication date criteria, to determine whether the first content item is aggregated content; and
when the first content item is not determined to be aggregated content based on the predetermined publication date criteria, reviewing an identified author of the first content item in view of predetermined authorship criteria, to determine whether the first content item is aggregated content.

11. The computer-implemented method of claim 10, wherein:
the first content item is determined to be aggregated content; and
the method further comprises flagging the first content item as an aggregated content item.

12. The computer-implemented method of claim 11, further comprising:
filtering the aggregated content from stored webcrawler data to obtain filtered webcrawler data; and
outputting the filtered webcrawler data for presentation to a user.

13. A computing system comprising a processor and a memory having computer-executable instructions stored thereon that, when executed by the processor, cause the computing system to:
obtain a first content item from an online source, wherein the first content item is obtained via network connection;
generate a characterizing signature of the first content item, by:
selecting a quantity of text for analysis, the first content item comprising the quantity of text;
eliminating filler words from the quantity of text to identify a plurality of significant words;
arranging a predetermined number of the plurality of significant words from the quantity of text to create a document key;
applying a hash function to the document key to obtain a hashed document key; and
appending a language identifier to the hashed document key to create the characterizing signature;
find a previously-saved instance of the characterizing signature in a cache memory architecture of the computing system;
retrieve, from the cache memory architecture, data associated with a second content item, in response to finding the previously-saved instance of the characterizing signature, wherein the second content item is characterized by the characterizing signature;
analyze the data associated with the second content item, corresponding data associated with the first content item, and decision criteria; and
identify either the first content item or the second content item as an original content item, based on the analyzing.

14. The computing system of claim 13, wherein the computer-executable instructions, when executed by the processor, cause the computing system to:
save a source uniform resource locator (URL) of the first content item in association with the characterizing signature.

15. The computing system of claim 13, wherein the data associated with the second content item, the corresponding data associated with the first content item, and the decision criteria is analyzed by:
comparing a first update frequency associated with a source of the first content item against predetermined update frequency criteria; and
comparing a second update frequency associated with a source of the second content item against the predetermined update frequency criteria.

16. The computing system of claim 13, wherein the data associated with the second content item, the corresponding data associated with the first content item, and the decision criteria is analyzed by:
analyzing one or more first outbound links associated with a source of the first content item in view of predetermined outbound link criteria; and
analyzing one or more second outbound links associated with a source of the second content item in view of the predetermined outbound link criteria.

17. The computing system of claim 13, wherein the data associated with the second content item, the corresponding data associated with the first content item, and the decision criteria is analyzed by:
checking a first publication date of the first content item relative to predetermined publication date criteria; and
checking a second publication date of the second content item relative to the predetermined publication date criteria.

18. The computing system of claim 13, wherein the data associated with the second content item, the corresponding data associated with the first content item, and the decision criteria is analyzed by:
reviewing a first identified author of the first content item in view of predetermined authorship criteria; and
reviewing a second identified author of the second content item in view of the predetermined authorship criteria.

19. A tangible and non-transitory computer readable medium having computer-executable instructions stored thereon that, when executed by a processor, perform a method comprising:
obtaining, at a computer system, a first content item from an online source, wherein the first content item is obtained via network connection;
generating a characterizing signature of the first content item, by:
selecting a quantity of text for analysis, the first content item comprising the quantity of text;

eliminating filler words from the quantity of text to identify a plurality of significant words;
arranging a predetermined number of the plurality of significant words from the quantity of text to create a document key;
applying a hash function to the document key to obtain a hashed document key; and
appending a language identifier to the hashed document key to create the characterizing signature;
finding a previously-saved instance of the characterizing signature in a cache memory architecture of the computer system;
retrieving data associated with a second content item from the cache memory architecture, in response to finding the previously-saved instance of the characterizing signature, wherein the second content item is characterized by the characterizing signature;
analyzing the data associated with the second content item, and corresponding data associated with the first content item; and
identifying either the first content item or the second content item as an original content item, based on the analyzing.

20. The computer readable medium of claim 19, wherein the analyzing comprises:
analyzing an update frequency associated with a source of the first content item, and an update frequency associated with a source of the second content item, to determine whether the first content item or the second content item is likely to be aggregated content;
analyzing one or more outbound links associated with a source of the first content item, and one or more outbound links associated with a source of the second content item, to determine whether the first content item or the second content item is likely to be aggregated content;
checking a publication date of the first content item, and a publication date of the second content item, to determine whether the first content item or the second content item is likely to be aggregated content; and
reviewing an identified author of the first content item, and an identified author of the second content item, to determine whether the first content item or the second content item is likely to be aggregated content.

\* \* \* \* \*